United States Patent [19]

Cominetti et al.

[11] Patent Number: 4,887,269

[45] Date of Patent: Dec. 12, 1989

[54] APPARATUS FOR THE RECEPTION OF RADIO BROADCASTED DIGITAL SIGNALS

[75] Inventors: Mario Cominetti, San Mauro Torinese; Alberto Morello, Turin, both of Italy

[73] Assignee: RAI Radiotelevisione Italiana, Torino, Italy

[21] Appl. No.: 127,411

[22] Filed: Dec. 2, 1987

[30] Foreign Application Priority Data

Dec. 19, 1986 [IT] Italy ................................ 22762 A/86

[51] Int. Cl.[4] .............................................. G06F 11/10

[52] U.S. Cl. ...................................................... 371/47

[58] Field of Search ........................ 371/32, 33, 35, 37, 371/47

[56] References Cited

U.S. PATENT DOCUMENTS

| | | | |
|---|---|---|---|
| 4,082,922 | 4/1978 | Chu | 371/33 |
| 4,439,859 | 3/1984 | Donnan | 371/32 |
| 4,511,958 | 4/1985 | Funk | 371/33 |
| 4,584,684 | 4/1986 | Nagasawa et al. | 371/33 |
| 4,730,348 | 3/1988 | MacCrisken | 371/33 |

*Primary Examiner*—Charles E. Atkinson
*Attorney, Agent, or Firm*—Amster, Rothstein & Ebenstein

[57] ABSTRACT

Digital characters are broadcast by grouping the characters into a series of blocks, and providing each block with a synchronization character and an identifying prefix to form a digital package. The characters in the prefix provide information on the identity of the series, the overall number of packages which form the series, and the number of each package in the series. The characters of the various packages are converted into a 10-bit serial data format which includes one start bit, one stop bit and eight data bits. The serial data is transmitted in synchronous succession, encoded into a differential two-phase signal, and modulated onto a carrier frequency for broadcasting. The reception apparatus comprises a receiver, a digital computer and a connecting interface between the receiver and the serial input of the computer. The interface includes a bit clock signal generator for detecting the mid-bit transitions of the differential two-phase signal to produce a clock signal, a two-phase decoder comprising an EXOR gate driven by the differential two-phase signal and by the clock signal to provide a differential output signal, and a differential decoder comprising an EXOR gate and a delay circuit both driven by the differential signal, with the output of the delay circuit driving a second input of the EXOR gate to provide as output a digital signal representing the broadcast characters.

5 Claims, 2 Drawing Sheets

APPARATUS FOR THE RECEPTION OF RADIO BROADCASTED DIGITAL SIGNALS

BACKGROUND OF THE INVENTION

The present invention relates to a process for the radio broadcasting of digital signals, particularly of computer programs and data, and relates more particularly to the problem of broadcasting, on television or radio channels (including line radio), sequences of characters in serial format (files), be they instruction programs or data, which can be received by the users using an apparatus comprising, besides a digital computer, an ordinary radio or TV or line radio receiver, and a low-cost interface. The invention furthermore relates to an apparatus for the reception of said signals.

Transmissions of computer programs (software) via radio have already been performed using telephone-type modems. Such prior solutions did not provide error protection and used a low transmission rate (typically 300 bit/sec); moreover, the cost of the additional circuits, such as the modem, with which the receiving computer had to be fitted, was very high.

SUMMARY OF THE INVENTION

The aim of the present invention is therefore to provide a process for the radio broadcasting of digital signals, particularly of programs and computer data, which allows the transmission at considerably higher rates than those hitherto achieved and with low error incidence, though requiring similar and more economical interface circuits.

Another object is to provide said process so that it also allows the cyclic, or iterated, transmission of the sequences of characters to be broadcast, so as to allow the acquisition of the data by successive partial attempts, even in the presence of high noise.

Still another object is to provide said process so that it is immune from polarity reversals of the transmitted signal, avoiding reversal ambiguities in the received bits.

This aim, as well as these and other objects which will become apparent hereinafter are achieved by the invention with a process for the radio broadcasting of digital signals, particularly of computer programs and data, comprising the following steps:

dividing the sequence of characters to be broadcast into blocks constituted by a preset number of characters;

prefixing a synchronization character and a prefix having a fixed number of characters to each of said blocks so as to constitute a package of characters to be broadcast, the characters of the prefix comprising a sequence identifier (PA), the overall number (N) of packages which form the sequence, and the progressive number (I) of the package in the sequence;

converting the characters of the various packages in succession into 10-bit serial form, with one start bit, one stop bit and eight data bits, transmitted in synchronous succession;

encoding said synchronous succession of serial characters in a differential two-phase form; and modulating the differential two-phase signal thus obtained on a carrier or subcarrier for broadcasting.

The invention furthermore provides an apparatus for the reception of signals broadcast by means of the above described process, comprising a receiver adapted to demodulate the broadcast signal, a digital computer adapted to process a succession of serial characters divided into packages, and an interface between the output of said receiver and the serial input of said computer, characterized in that said interface comprises:

(a) a bit clock signal generator device adapted to detect the mid-bit transitions of the differential two-phase coded signal to produce a clock signal synchronized with the frequency of said signal;

(b) a two-phase decoder comprising an EXOR gate driven by said differential two-phase coded signal and by said clock signal to provide in output a differential NRZ signal; and (c) a differential decoder comprising an EXOR gate having an input driven by said NRZ differential signal and a delay circuit adapted to introduce a delay of the duration of one bit, driven by said differential NRZ signal, its output driving a second input of said EXOR gate, to provide a digital signal in output.

BRIEF DESCRIPTION OF THE DRAWINGS

A preferred embodiment of the invention is now described, and is given only by way of non-limitative example, with reference to the accompanying drawings, wherein.

DESCRIPTION OF THE PREFERRED EMBODIMENTS

According to the invention, for the radio broadcasting of a sequence of characters (file) with subsequent reception and acquisition of the file on the part of users equipped with a radio receiver and a computer, an electromagnetic signal to be transmitted is generated as described hereinafter.

Figure 1:
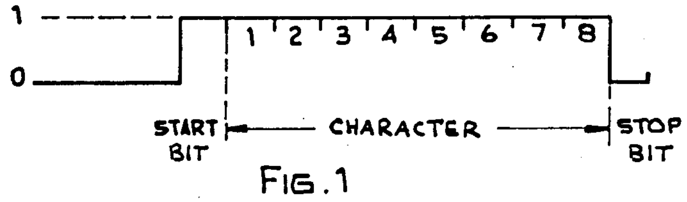
FIG. 1 is a symbolic representation of a 10-bit character used in the process.

Each character of the sequence (that is to say, each byte of the file) to be radio-broadcast is encoded in serial 8-bit form, the first bit being preferably complemented, a start bit, always equal to 1, is prefixed to each character, and an end bit, always equal to 0, is also appended thereto, as shown in FIG. 1. The complementing of the first data bit facilitates the recovery of character synchronization in reception, as will become apparent hereinafter.

Such 10-bit structures are easy to generate with a transmission computer (not illustrated), starting from the original file (stored on a non-volatile support such as magnetic disk or tape), with pure software means, obvious for the expert in the field, besides a serial port such as an RS-232 port.

Figure 2:
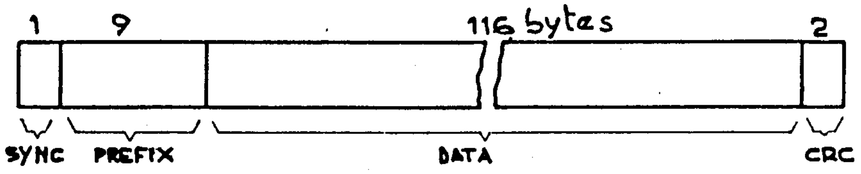
FIG. 2 is a symbolic representation of a data package used in the process.

Besides generating characters in the above described format, the transmission computer is also assigned to the task of formatting the sequences of characters in blocks of 116 characters (or bytes), prefixing each block with a nine-byte prefix, which will be described hereinafter, and appending thereto a per se known pair of error control bytes (CRC), so as to obtain 127 bytes. A framing code byte (SYNC code, that is to say 01111110) is furthermore prefixed to these bytes, so as to form a 128-byte package (FIG. 2), which is the information unit handled by the reception software, as will become apparent hereinafter.

The 9-byte package prefix comprises:

(a) a PT package type indicator, constituted by a single byte;

(b) a package address PA, formed by two bytes in Hamming code (8, 4), constituting a useful eight-bit information, the other eight bits being intended for error detection and/or correction, in a per se known manner: the package address PA acts as file identifier;

(c) a continuity index I, that is to say the progressive number of the package in the sequence of characters to be broadcast, formed by three bytes in Hamming code (8, 4), and therefore having twelve data bits; e (d) an indicator N of the number of packages which constitute the sequence of characters to be broadcast: this datum is also in Hamming code (8, 4) and comprises therefore twelve data bytes.

The package type indicator PT is included in the prefix in order to allow the adoption of other package protocols, which may be useful in the future, without causing compatibility problems. For example, in the transmission of data for immediate use (on-screen display of alphanumeric messages, speech synthesis, etc.), a package type is provided in which the prefix is reduced to the PT indicator alone, while the other data (PA, I, N) are in this case redundant. The data bytes in the package are then 124 instead of 116.

Preferably, the use is provided of four possible PT indicators, for as many package types, with a Hamming spacing of 5 between the different usable indicators, in order to ensure the correct reception of the indicator even in the presence of high noise.

Preferably, the PA addresses having values "0000 0000" and "0000 0001" are respectively reserved, the first to a special menu file, constituted by a list of the files (or character sequences) being transmitted, the second to a comment file for said files being transmitted, adapted to provide the user with information useful for the evaluation of the purposes and the interest of the various files.

The characters or bytes formatted in the above described manner are transmitted from the serial port in synchronous succession, that is to say with uniform timing and with no interval between the stop bit of one character and the start bit of the following character, in this manner the timing of the start (or stop) bit constituting a character clock which is recoverable in reception, as will become apparent hereinafter.

Figure 3:
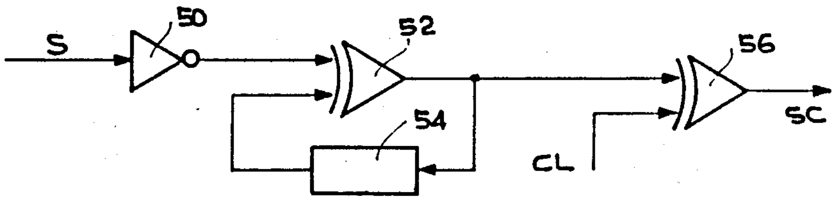
FIG. 3 is a schematic diagram of an interface for the broadcasting of a signal with the process according to the invention.

With reference to FIG. 3, the synchronous serial succession S of 10-bit characters, formatted in 128-byte packages, as described above, is sent to an interface which is external to the computer, in which the signal S emitted by the computer is complemented by an inverter 50 and then converted to differential NRZ (No Return to Zero) coding. As is known, differential coding allows to remove the 180o ambiguity on the clock phase in reception, which is due to reversals of the signal during the transmission or reception process or in possible recording on magnetic tape. Since I(n) and U(n) are respectively the input signal and the output signal of the differential encoder at the time n, the differential coding rule implemented by the encoder is as follows:

$$U(n)=I(n)\,EXOR\;U(n-1).$$

This differential coding is performed by the EXOR gate 52 and by the delay circuit 54, which has a delay of the duration of one bit, to implement the abovesaid relation.

A further EXOR gate 56 then performs the two-phase coding (Manchester Level) of the signal, by means of the EXOR combination with a clock signal CL at double the frequency of the bit timing, the output signal SC thus coded being sent to a transmission modulator, not illustrated.

As is known, in two-phase coding each NRZ 1 bit is represented by a pair of 1–0 levels, and each NRZ 0 bit is represented by a pair of 0–1 levels. In the first case a transition from 1 to 0 in mid-bit occurs, in the second case a transition from 0 to 1 in mid-bit occurs. Two-phase coding eliminates the continuous components of the spectrum of the signal and facilitates the recovery of bit synchronization in reception, by virtue of the fixed mid-bit transitions. This allows, among other things, to set a fixed 0-volt comparation threshold in the reception of the signal, regardless of the amplitude of the data signal.

Figure 4:
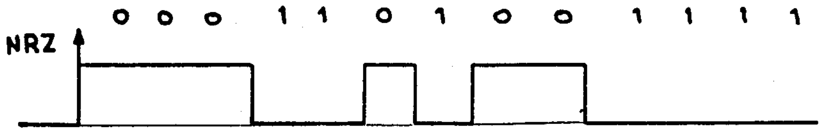
FIGS. 4, 5, 6 and 7 are diagrams of illustrative signals, useful for the understanding of the invention.
Figure 5:
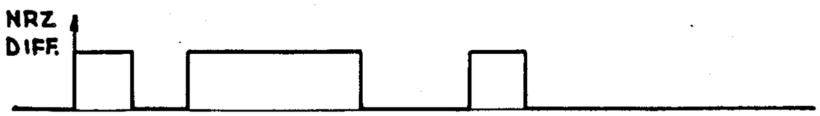
Figure 6:
Figure 7:

FIG. 4 is a diagram, by way of example, of a complemented NRZ signal, and FIG. 5 is a diagram of said signal after differential coding. FIG. 6 shows the clock, and FIG. 7 shows the signal of FIG. 5 after conversion to two-phase by means of EXOR combination with the clock.

The signal thus generated is finally applied to an FM modulator, for modulation on a carrier or subcarrier in a conventional manner and for subsequent wireless, or other type, broadcasting.

If one considers the band-pass of good-quality commercial radio receivers and magnetic recorders to be 8–10 KHz, with the described process one preferably adopts a transmission rate of 4800 bit/sec. With wider band-passes, for example 15 KHz, transmission rates of 9600 bit/sec can be achieved.

A further characteristic of the above described process for the radio broadcasting of digital signals resides in the fact that the transmission can occur according to three distinct modes:

(a) individual transmission of a file;

(b) transmission of a single file repeated several times;

(c) cyclic transmission of more than one file.

In cases (b) and (c) reception can begin at any time, and the receiver can be organized so as to acquire the individual packages in an arbitrary order and sort them correctly using the progressive index I. Moreover, the receiver can acquire more than one copy of the same package, and in case of mismatch between the copies it can perform error correction with prevalence logic.

Moreover, within the scope of the above described radio broadcasting process, various conventions and approaches, compatible with the above indicated specifications and mostly obvious for the expert in the field, are naturally applicable, to provide additional performances and to extend the applications. For example, one can transmit encrypted files, or with spectrum optimized by scrambling, etc.

The circuital arrangements for the actuation of the above described steps of the radio-broadcasting process, that is to say of the formatting in packages, of complementing, of differential coding, of two-phase coding, of modulation on a carrier or subcarrier, are each per se straightforward to provide for the expert in the field according to the above described operational specifications, and are easily deductible from the literature, so their description is therefore omitted.

For the reception of the above described radiofrequency signal and for its conversion into characters or bytes to reconstruct the original sequence or file, the radiofrequency signal is demodulated in an ordinary receiver, so as to obtain a base band signal, with no continuous component by virtue of two-phase coding.

Figure 8:
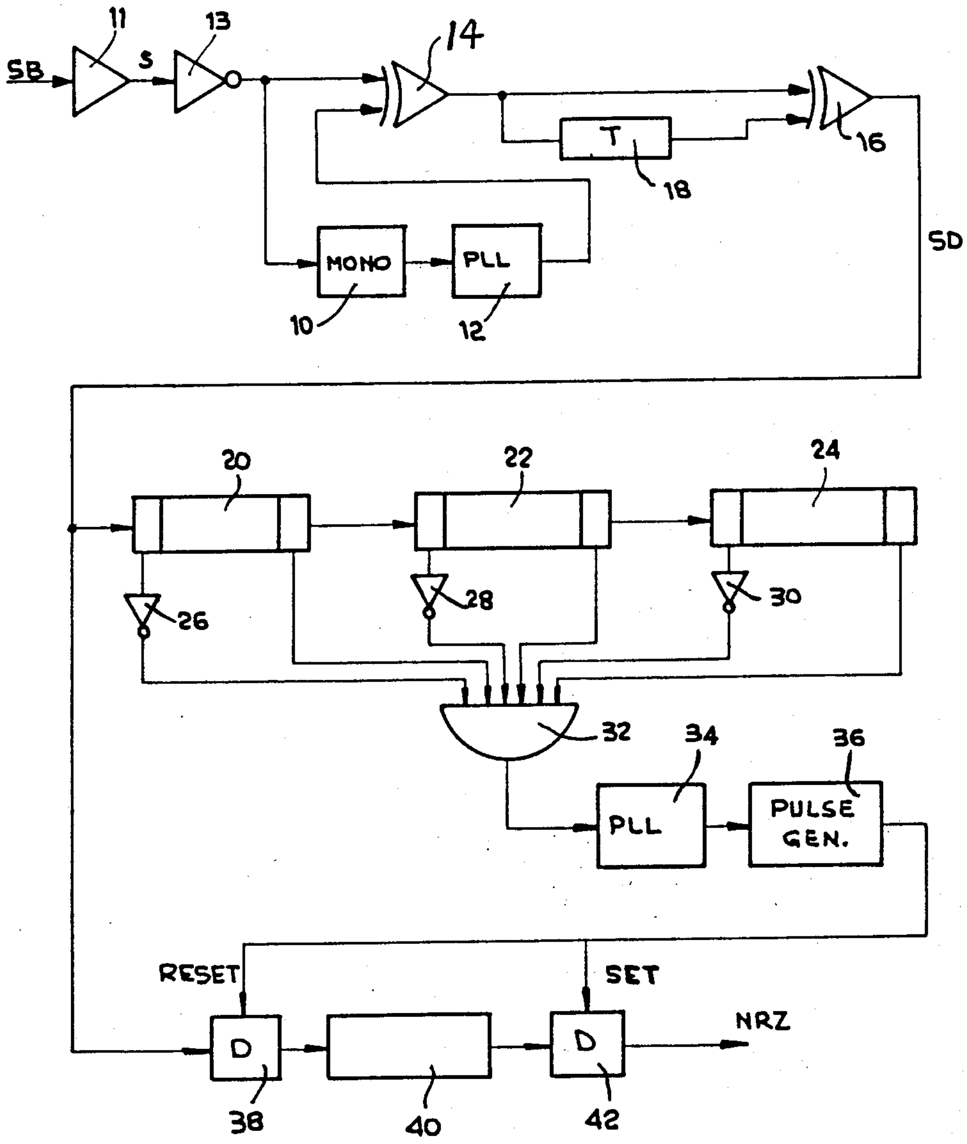
FIG. 8 is a schematic diagram of an interface for the reception of a signal broadcast with the process according to the invention.

The base band signal SB produced by the demodulator is applied to an interface, having a simple structure and a low cost, which is adapted to reconstruct the original NRZ signal, for its application to a serial port, such as the RS-232 port of a computer. A possible non-exclusive embodiment of said interface is now described with reference to the schematic representation of FIG. 8.

The interface comprises a comparator 11 for comparison with a 0-volt threshold, adapted to receive the base band signal SB and to provide a squared logical signal S, which is complemented by an inverter 13 (to compensate the complementing performed in broadcasting) and is applied to a clock recovery circuit constituted by a monostable multivibrator 10, sensitive to all the transitions of the input signal, non-retriggerable (when the output is active the input transitions are ignored), which generates a pulse with a duration equal to ¾ of the duration T of one bit in the flow of transmitted data, and by a PLL (Phase-Locked Loop) circuit 12.

The monostable 12 can lock either to the mid-bit transition (correct mode) or to the end transition (wrong mode). In the first case the output pulse of the monostable, taking into account its duration, starts at the center of the bit and ends after the possible transition at the end of the bit, masking it: the output is a rectangular wave with period T and positive front at the center of each bit.

In the second case, supposing the broadcast data is random, incorrect locking (to the end transition) rapidly ends, as soon as an end transition is missing, and the monostable 10 passes to the correct locking.

Instead, in the case of a fixed sequence of all zeros (wait state of the RS-232 port of the transmitting computer) the two-phase differential signal is periodic, with a fixed frequency (4800 Hz), and therefore with permanent transitions both at the center and at the end of the bit. Therefore the clock recovery circuit has a 50% chance of locking stably in an incorrect manner onto the end transitions. In order to avoid this condition, which would cause the loss of the first bytes of the transmitted file, the choice has been made to complement the NRZ signal before differential coding, as described above, so that the wait state of the RS-232 is equal to a signal with a fixed frequency of 2400 Hz and with only mid-bit transitions, which does not allow synchronization errors.

Since the output signal of the monostable 10 is affected by jitter and by noise due to the distortions of the channel, the PLL circuit 12 is used in a per se known manner, locked to the output of the monostable.

The output clock CL of the PLL 12 and the signal S drive the two inputs of an EXOR gate 14, which performs the two-phase decoding, converting each -1 or 1-0 pair into the corresponding bit. Possible rotations through 180o are recovered by the subsequent differential NRZ decoding. The latter consists of the EXOR of the current bit with the preceding one, and is performed by the EXOR gate 16, driven by the output of the EXOR gate 14 both directly and through a delay circuit 18 which delays by one bit period.

The output signal of the EXOR gate 16 is therefore a succession SD of pulses which represent bits, which can be used directly, after an appropriate translation of levels as is obvious for the expert, by the serial port of a computer, or can be sent to a device which performs error correction on the start and stop bits.

A non-exclusive embodiment of the correction device is as follows. The signal SD is applied to a cascade of three sliding registers 20, 22, 24, each 10 bits long. Every ten steps of advancement of the signal in the three registers, the same contain respective successive characters, with the start bits (equal to 1) in the head cells and with the stop bits (equal to 0) in the tail cells. The bits in the tail cells are complemented in the inverters 26, 28, 30. The six signals thus obtained, which in the case of alignment of the characters in the three registers hypothesized above are all equal to 1, are applied to the respective inputs of an AND gate 32. At the output thereof there appears a pulse (having a one-bit duration T) each time the configuration "0xxxx xxxxl" is detected simultaneously in the three registers. In the absence of reception errors, one obtains a train of pulses with period 10*T at the output of the AND gate 32, with some spurious pulses due to the random presence of configurations as described above within the useful data. In the presence of reception errors, the train of periodic pulses can lack some element.

In order to reconstruct said missing elements, the interface furthermore comprises a flywheel circuit constituted by a PLL loop 34 with a central frequency of 1/(10*T), which locks to the periodic train of pulses, filtering the spurious pulses and regenerating the ones deleted by errors, and which drives a pulse generator 36.

The serial signal SD is also applied to the cascade coupling of a D flip-flop 38, of an 8-bit sliding register 40, and of another D flip-flop 42. The output pulses of the generator 36 are applied to the Reset and Set inputs of the two flip-flops, to force on the data the start-stop configuration before being sent to the serial port of the computer.

The output of the above described interface is therefore the reconstructed NRZ signal, and is applied to the RS-232 port of the receiving computer (not shown) after an appropriate translation of the voltage levels. The latter then receives a succession of characters with start and stop bits, and performs a processing thereof for their use which substantially consists of the following steps:

(a) character synchronization;
(b) frame synchronization (package);
(c) error correction in the package prefix;
(d) search for packages according to the address PA requested by the user;
(e) sorting according to the progressive index I;
(f) storage of the packages.

Asynchronous serial ports, such as the RS-232 port, are designed to start from a wait state (fixed logical 0 on the receive line) and to interpret as start bit of the first character the first 1 received after the wait period.

The serial interface indicates (framing error) the absence of the stop bit in a character. In this case, instead, when the transmission of the file is iterated, the computer starts to receive while the broadcast is in progress.

Character synchronization is then performed by the computer with the following character synchronization algorithm:

the reception is enabled at an arbitrary time, interpreting the first 1 received as start bit;

in the absence of framing error, the nine subsequent characters also give no framing error, thus assuming that the acquired synchronization is correct;

in the presence of framing error, the serial port is disabled and re-enabled after a delay which is increased at every synchronization attempt, repeating the algorithm from the start; after 250 failed attempts the abnormal condition is notified to the user.

As previously described, the first data bit of each character is preferably complemented. This solution facilitates character synchronization in the case of broadcast of ASCII-code texts, in which the first bit of each character is constantly 0: the complementing of said bit avoids the probable occurrence of a sequence which may be erroneously interpreted as start and stop, and makes the acquisition of character synchronization faster.

Once character synchronization has been achieved, the computer enters a frame synchronization search state, in which it compares the characters as they are received with the above described SYNC character. Having found the match, it enters a frame synchronization confirmation state. In this state the computer waits for 127 characters, and then again checks synchronization. If it finds it, it enters normal reception state, assuming itself to be synchronized. Otherwise it returns to search state.

In normal reception state the computer checks that the SYNC character is present at each frame, and accepts single or double errors (these last are frequent due to differential coding). When the errors exceed said limit, the computer passes to a flywheel state which controls the subsequent SYNC; if this time the errors are again more than two, the systems enters the synchronization search state, otherwise it returns to the normal state.

The algorithm thus enters synchronization when it finds the correct SYNC for two consecutive times, and leaves it when it detects more than two errors or two consecutive times.

The correction and decoding of the package prefix are obvious for the expert in the field according to what is explained above, and so are the search for the packages with the required address PA, sorting according to the progressive index I, and storage of the packages.

Preferred embodiments of the invention have been described, but naturally they are susceptible to equivalent modifications and variations, within the scope of the given teachings, without thereby abandoning the scope of the inventive concept.

We claim:

1. Apparatus for receiving radio broadcasted digital signals produced by grouping a desired sequence of characters into a series of digital blocks, each block of said series starting with a synchronization character and a prefix which includes a sequence identifier, the overall number of blocks forming said series, and the number of said block in said series, wherein each character of said sequence is serially encoded to have a start bit, a stop bit and eight data bits therebetween, said series of blocks being further converted into a differential two-phase signal which is broadcast by modulation onto a carrier frequency, said apparatus for receiving said broadcasted signals comprising:

(a) a receiver for demodulating said differential two-phase signal;

(b) a digital computer having a serial input for processing said series of blocks; and (c) an interface between said receiver and said serial input of said digital computer, said interface further including a bit clock signal generator adapted to detect the mid-bit transitions of the differential two-phase signal to provide a clock signal synchronized with the frequency of said differential two-phase signal, a two-phase decoder having an EXOR gate driven by said differential two-phase signal and by said clock signal to provide a differential NRZ signal as an output, and a differential decoder comprising an EXOR gate having an input driven by said differential NRZ signal and a delay circuit adapted to introduce a delay of the duration of 1-bit, said delay circuit being driven by said differential NRZ signal, and having an output which drives a second input of said EXOR gate, to provide a digital signal as output.

2. Apparatus according to claim 1, characterized in that said clock generator device comprises a monostable multivibrator (10) having a pulse duration of approximately $\frac{3}{4}$ the period of the signal in differential two-phase coding, and driven thereby, its output signal controlling a phase-lock loop (12) the output whereof constitutes said clock signal.

3. Apparatus according to claim 1 or 2, characterized in that it furthermore comprises a device for the detection and correction of errors in the character synchronization bits (20–42), whereto said digital signal in output from the differential decoder is applied.

4. Apparatus according to claim 3, characterized in that said device for detecting and correcting the errors in the character synchronization bits comprises:

(a) a plurality of cascade coupled 10-bit sliding registers (20, 22, 24), whereto said digital signal is applied;

(b) an AND gate (32) the inputs whereof are driven by the first bits of said respective sliding registers in direct form and by the last bits of said respective sliding registers in complemented form;

(c) circuit means (34, 36, 38, 40, 42) whereto is applied said digital signal, synchronized by the output of said AND gate with a period of ten times the bit period, to force to 1 the first bit of each character of said digital signal and to force to 0 the last bit of each character of said digital signal.

5. Apparatus according to one of claims 1, wherein the serial input of said computer is adapted to provide a framing error signal when a received 10-bit character is not provided with a correct stop bit, characterized in that in order to acquire character synchronization the computer performs the following algorithm:

enable reception at an arbitrary time, interpreting the first 1 received as start bit;

in the absence of framing error, check that a preset number of successive characters also give no framing error, then assuming that the acquired synchronization is correct;

in the presence of framing error, disable the serial port, and re-enable it after a delay which is increased at every synchronization attempt, repeating the abovesaid steps from the start; and after a preset number of executions of the abovesaid steps without elimination of the framing error, provide an error signal.

* * * * *